United States Patent
Huang et al.

(10) Patent No.: US 10,044,217 B2
(45) Date of Patent: Aug. 7, 2018

(54) MOBILE TERMINAL, DC-CHARGING POWER SOURCE ADAPTOR, AND RAPID CHARGING METHOD

(71) Applicant: HISENSE MOBILE COMMUNICATIONS TECHNOLOGY CO., LTD., Qingdao (CN)

(72) Inventors: Yaling Huang, Qingdao (CN); Chunqian Li, Qingdao (CN); Naifeng Zhang, Qingdao (CN); Wenjuan Du, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO. LTD., Qingdao (CN)

( * ) Notice: Subject to any disclaimer, the term of this patent is extended or adjusted under 35 U.S.C. 154(b) by 212 days.

(21) Appl. No.: 15/052,007

(22) Filed: Feb. 24, 2016

(65) Prior Publication Data
US 2017/0040805 A1     Feb. 9, 2017

(30) Foreign Application Priority Data
Aug. 5, 2015    (CN) .......................... 2015 1 0473429

(51) Int. Cl.
*H02J 7/00*     (2006.01)
*H02J 7/04*     (2006.01)
*H02J 7/02*     (2016.01)

(52) U.S. Cl.
CPC ............. *H02J 7/045* (2013.01); *H02J 7/022* (2013.01); *H02J 2007/0062* (2013.01); *H02J 2007/0096* (2013.01)

(58) Field of Classification Search
CPC ...................................................... H02J 7/00
(Continued)

(56) References Cited

U.S. PATENT DOCUMENTS 7,528,574 B1   5/2009   Adkins et al.
9,197,086 B2   11/2015   Zhou et al.
(Continued)

FOREIGN PATENT DOCUMENTS

CN    201590668     9/2010
CN    103236568 A   8/2013
(Continued)

OTHER PUBLICATIONS

Office Action from corresponding Chinese Application No. 201510473429.7, dated Aug. 1, 2017 (8 pages).
(Continued)

*Primary Examiner* — Mohammed Alam
(74) *Attorney, Agent, or Firm* — Harness, Dickey & Pierce, P.L.C.

(57) ABSTRACT

This disclosure provides a mobile terminal, a DC-charging power source adaptor, and a rapid charging method, which are proposed for a power source adaptor outputting dynamically adjustable voltage, where core voltage of a battery is divided into several intervals, and further in a segmented constant-current-like charging mode, a volt value of charging voltage output by the power source adaptor is adjusted dynamically according to the interval in which the core voltage of the battery in the mobile terminal while the battery is being charged lies, and the battery is DC-charged directly using the charging voltage output by the power source adaptor.

15 Claims, 5 Drawing Sheets

(58) Field of Classification Search
USPC .......................................................... 320/162
See application file for complete search history.

(56) References Cited

U.S. PATENT DOCUMENTS

| | | | |
|---|---|---|---|
| 9,300,159 B2 | 3/2016 | Sun et al. | |
| 2005/0001590 A1* | 1/2005 | Bayne | H02J 7/0027 |
| | | | 320/128 |
| 2007/0188134 A1 | 8/2007 | Hussain et al. | |
| 2008/0061733 A1* | 3/2008 | Toya | H02J 7/025 |
| | | | 320/103 |
| 2008/0100143 A1 | 5/2008 | Lipcsei | |
| 2009/0184687 A1 | 7/2009 | Schroeder et al. | |
| 2010/0115147 A1 | 5/2010 | Kim | |
| 2011/0279078 A1* | 11/2011 | Hara | H02J 7/027 |
| | | | 320/107 |
| 2014/0015507 A1 | 1/2014 | Park et al. | |
| 2014/0167706 A1 | 6/2014 | Sun et al. | |
| 2014/0203761 A1 | 7/2014 | Paparrizos et al. | |
| 2016/0094084 A1 | 3/2016 | Sotani et al. | |
| 2016/0214500 A1 | 7/2016 | Kim et al. | |
| 2016/0261127 A1 | 9/2016 | Worry et al. | |
| 2016/0336779 A1 | 11/2016 | Hu et al. | |
| 2016/0352132 A1 | 12/2016 | Zhang et al. | |
| 2017/0040804 A1 | 2/2017 | Hu et al. | |
| 2017/0040805 A1* | 2/2017 | Huang | H02J 7/022 |
| 2017/0040810 A1 | 2/2017 | Hu et al. | |
| 2017/0040812 A1* | 2/2017 | Li | H02J 7/0044 |
| 2017/0040821 A1 | 2/2017 | Li et al. | |
| 2017/0066342 A1 | 3/2017 | Butler et al. | |

FOREIGN PATENT DOCUMENTS

| | | |
|---|---|---|
| CN | 103872398 A | 6/2014 |
| CN | 102880238 | 7/2015 |
| CN | 104796011 | 7/2015 |
| CN | 103872398 | 9/2016 |
| JP | 2007267498 A | 10/2007 |
| WO | 2012086788 | 6/2012 |

OTHER PUBLICATIONS

Office Action from related Chinese Application No. 201510473427.8 dated Oct. 27, 2016 (8 pages).
Office Action from related Chinese Application No. 201510473427.8 dated May 17, 2017 (8 pages).
Office Action from related Chinese Application No. 201510473336.4 dated Jan. 4, 2017 (10 pages).
Office Action from related Chinese Application No. 201510473321.8 dated Oct. 8, 2016 (4 pages).
Office Action from related Chinese Application No. 201510473321.8 dated Jun. 15, 2017 (5 pages).
Office Action from related Chinese Application No. 201510473321.8 dated Sep. 26, 2017 (5 pages).

* cited by examiner

MOBILE TERMINAL, DC-CHARGING POWER SOURCE ADAPTOR, AND RAPID CHARGING METHOD

CROSS-REFERENCE TO RELATED APPLICATION

This application claims the benefit and priority of Chinese Patent Application No. 201510473429.7 filed Aug. 5, 2015. The entire disclosure of the above application is incorporated herein by reference.

FIELD

The present disclosure relates to the field of Direct-Current (DC) charging and particularly to a method for charging rapidly a battery in a mobile terminal using a power source adaptor, and a mobile terminal and power source adaptor for the charging method.

BACKGROUND

This section provides background information related to the present disclosure which is not necessarily prior art.

At present, portable mobile terminals have been widely applied in numerous aspects of people's life, and have become a leading factor in the development of the semiconductor industry. The majority of the existing portable mobile terminals are provided with chargeable batteries to power system circuits in the mobile terminals. As an increasing number of functions supported by the portal mobile terminals are emerging, their system circuits also consume more and more power, and given a limited capacity of the batteries, the mobile terminals operate for a shorter and shorter period of time after the batteries are charged, resulting in that the batteries have to be charged more and more frequently.

At present the batteries have been widely charged in two general schemes: in one of the schemes, the batteries are charged by a general power source adaptor (charger), i.e., in the standard DCP charging scheme, where the general power source adaptor generally supports an output of only fixed voltage, e.g., 5V, 9V, 12V, etc., so that the output voltage may not be selectable flexibly, and it may take a long period of time to charge the batteries, for example, it typically takes 3 to 4 hours to charge a drained battery of a handset until the battery is fully charged; and in the other scheme, the batteries are charged by a host (e.g., a computer, etc.), i.e., in the SDP charging scheme.

SUMMARY

This section provides a general summary of the disclosure, and is not a comprehensive disclosure of its full scope or all of its features.

This disclosure provides a mobile terminal including a battery, a USB interface, and a microprocessor, wherein the battery is configured to store electric energy; the USB interface is configured to be connected with a DC-charging power source adaptor; and the microprocessor is configured to detect voltage of the battery upon detecting that the USB interface is connected with the DC-charging power source adaptor; if the voltage of the battery is in a range [S1, S2] delimited by preset DC-charging thresholds, to send the voltage of the battery to the DC-charging power source adaptor, so that the DC-charging power source adaptor outputs target charging voltage corresponding to the current voltage of the battery, and to transmit the target charging voltage output by the DC-charging power source adaptor directly to the battery to DC-charging the battery.

This disclosure further provides a DC-charging power source adaptor including a charging interface, an AC-to-DC converting unit, and a controlling unit, wherein the charging interface is configured to be externally connected with a mobile terminal; the AC to DC converting unit is configured to convert an AC input power source into charging voltage required for the mobile terminal, and to output the charging voltage via the charging interface; and the controlling unit connected with the charging interface is configured to communicate with the mobile terminal after the charging interface is connected with the mobile terminal, to receive voltage of a battery, in a range delimited by DC-charging thresholds, sent by the mobile terminal, to search a preset reference table using the voltage of the battery for target charging voltage value $V_{out}$ corresponding to an interval in which the voltage of the battery lies, and to adjust the charging voltage output by the AC to DC converting unit to the target charging voltage value $V_{out}$.

This disclosure further provides a rapid charging method including: detecting, by the mobile terminal, voltage of a battery thereof; if the voltage of the battery is in a range [S1, S2] delimited by preset DC-charging thresholds, then sending the voltage of the battery to a DC-charging power source adaptor; searching, by the DC-charging power source adaptor, a preset reference table using the voltage of the battery for target charging voltage value $V_{out}$ corresponding to an interval in which the voltage of the battery lies; adjusting, by the DC-charging power source adaptor, its output charging voltage to the target charging voltage value $V_{out}$; and receiving, by the mobile terminal, the charging voltage output by the DC-charging power source adaptor, and transmitting the charging voltage to the battery to DC-charge the battery.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In this disclosure, in order to make full use of such a characteristic of a DC-charging power source adaptor that output voltage thereof is dynamically adjustable, to thereby significantly speed up charging, firstly a mobile terminal in which a chargeable battery is built is adapted in hardware to enable the mobile terminal to support not only a normal charging mode in which the battery is charged by a power source managing chip in the mobile terminal, but also a DC-charging mode in which a charging power source is transmitted directly to the battery to DC-charge the battery at large current. Then software program is designed for the adapted hardware circuits to send a real-time change in core voltage of the battery being charged, to the DC-charging power source adaptor so that the DC-charging power source adaptor can adjust dynamically its output charging voltage to thereby shorten a period of time for charging the battery.

Firstly hardware configurations of the mobile terminal and the DC-charging power source adaptor will be described below with reference to FIG. 1.

Figure 1:
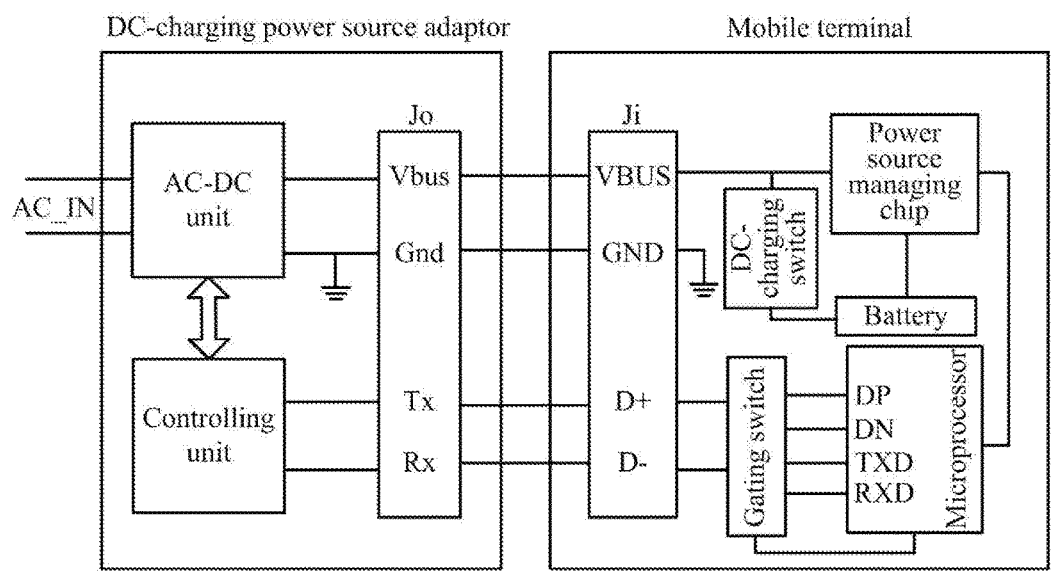
FIG. 1 is a circuit scheme block diagram of an embodiment of a charging system consisted of a mobile terminal and a DC-charging power source adaptor according to this disclosure.

As illustrated in FIG. 1, in order to maintain the existing traditional charging function of the mobile terminal so that the mobile terminal can be normally plugged in and charged by the existing host and normal power source adaptor, the existing charging interface of the mobile terminal is maintained in this embodiment, e.g., the currently widely applied USB interface Ji (for both charging and transmitting data), so that the mobile terminal can be plugged in and charged by the normal power source adaptor and computer host in the market, which are currently manufactured by the majority of the manufactures. For the power source pin VBUS in the USB interface Ji, in this embodiment, one branch thereof is connected with a power source managing chip in the mobile terminal, and another branch thereof is connected with the battery through a DC-charging switch, where the DC-charging switch can be any type of controllable switch element with low conduction impedance and supporting large current to pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with a systematical ground of mobile terminal so that the mobile terminal can be grounded together with the external device if the mobile terminal is plugged in the external device. For the differential data pins D+ and D- in the USB interface Ji, they are designed to be connected with the microprocessor through a gating switch, where the gating switch can be a double-pole double-throw switch, to receive a control signal output by the microprocessor, where the differential data pins D+ and D- of the USB interface Ji are connected by default with the differential data interfaces DP and DN of the microprocessor through the gating switch; and if it is detected that the externally connected charging device is neither the host nor the normal power source adaptor, then the gating switch will be controlled by the microprocessor to switch the differential data pins D+ and D- of the USB interface Ji to be connected with the UART interfaces TXD and RXD of the microprocessor to thereby identify in the UART communication mode whether the inserted external device is the DC-charging power source adaptor.

The microprocessor in the mobile terminal can be designed to initiate on its own initiative a communication command to the externally connected charging device in the UART communication mode after the differential data pins D+and D- of the USB interface Ji are switched to be connected with the UART interfaces TXD and RXD thereof, and if a valid command fed back by the external charging device is received, to determine that the inserted external device is the DC-charging power source adaptor; and if there is no valid command fed back, to disconnect the UART interfaces TXD and RXD of the microprocessor from the differential data pins D+ and D- of the USB interface Ji without starting the charging mode, or to further output an alert "Inserted Device Can Not Be Identified".

In this embodiment, the DC-charging power source adaptor is configured in the UART communication mode instead of the I2C bus communication mode for the reason that there is small communication traffic, a low rate, and a high anti-interference capability of UART communication in the asynchronous communication mode to thereby avoid effectively communication between the mobile terminal and the power source adaptor from becoming highly instable due to interference from current, impedance, voltage, and other signals so that the mobile terminal can be charged stably and rapidly at large current by the DC-charging power source adaptor to thereby improve the safety of the mobile terminal being charged.

Of course, communication between the mobile terminal and the DC-charging power source adaptor can alternatively be designed in another communication mode than UART (e.g., the I2C bus communication mode, etc.). For example, the mobile terminal and the DC-charging power source adaptor can be designed to exchange data in wireless communication with each other. Matched wireless communication modules, e.g., Bluetooth modules, WiFi modules, etc., can be arranged respectively in the mobile terminal and the DC-charging power source adaptor, and if the mobile terminal needs to exchange a communication instruction with the DC-charging power source adaptor, then the mobile terminal can send its generated communication instruction to the wireless communication module thereof to convert the communication instruction into a wireless signal sent to the DC-charging power source adaptor. Due to the wireless communication, such a difference in ground level between the power source adaptor and the mobile terminal can be addressed that arises from a significant voltage drop across a charging line between the power source adaptor and the mobile terminal being charged at large current, where the difference in ground level may otherwise have an influence on a quality of waveform of the communication signal, thus resulting in the instability of communication.

With the mobile terminal adapted in hardware as described above, the rapid charging method according to this embodiment will be described below with reference to FIG. 2 to FIG. 5.

Figure 2:
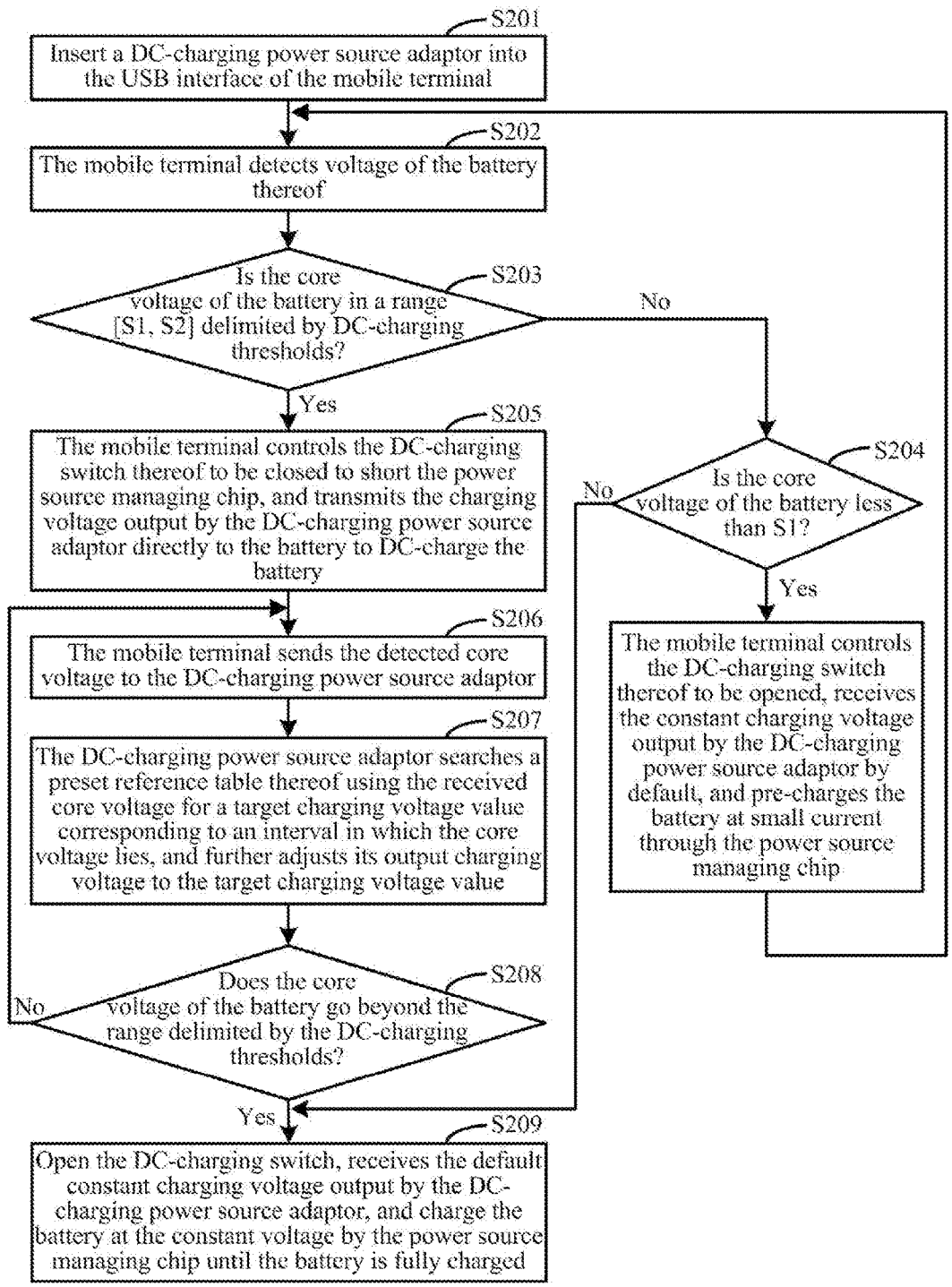
FIG. 2 is a flow chart of a process of an embodiment of a rapid charging method according to this disclosure.
Figure 3:
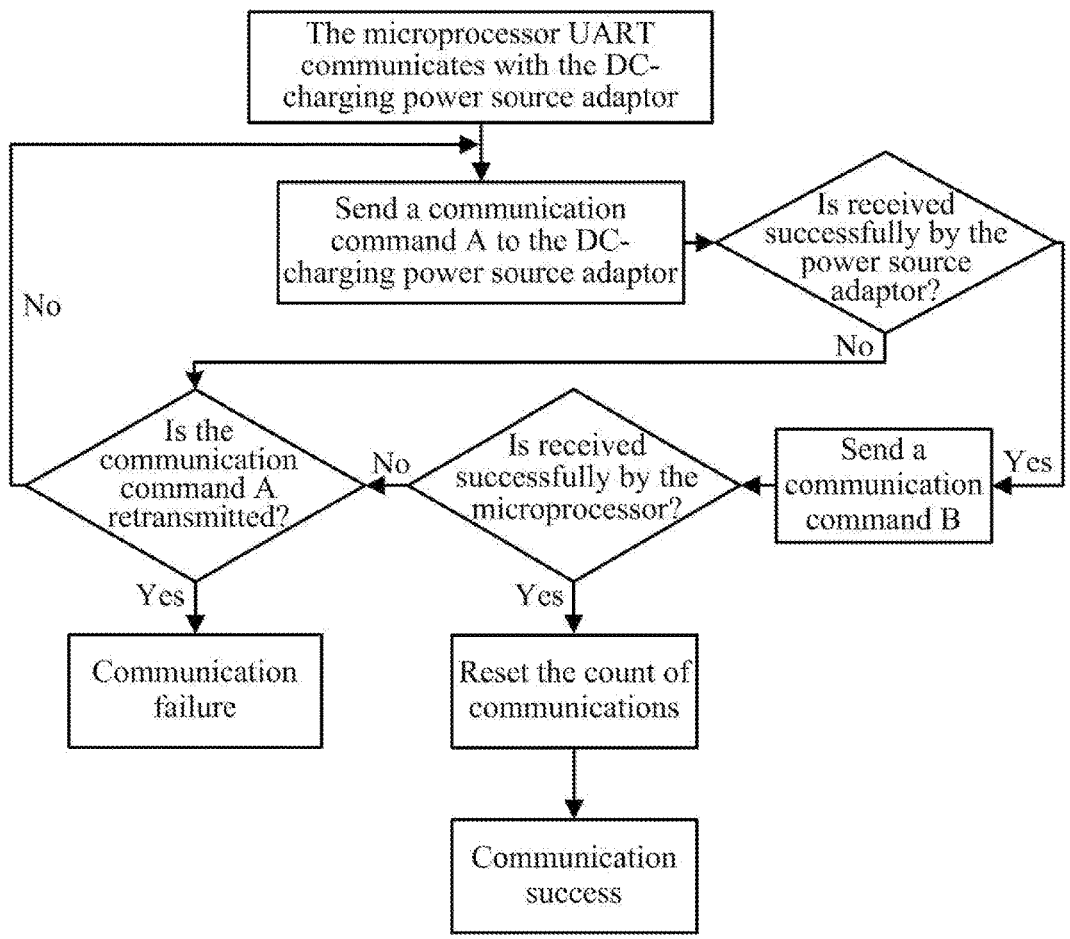
FIG. 3 is a flow chart of an embodiment of detecting communication between the mobile terminal and the DC-charging power source adaptor illustrated in FIG. 1.
Figure 4:
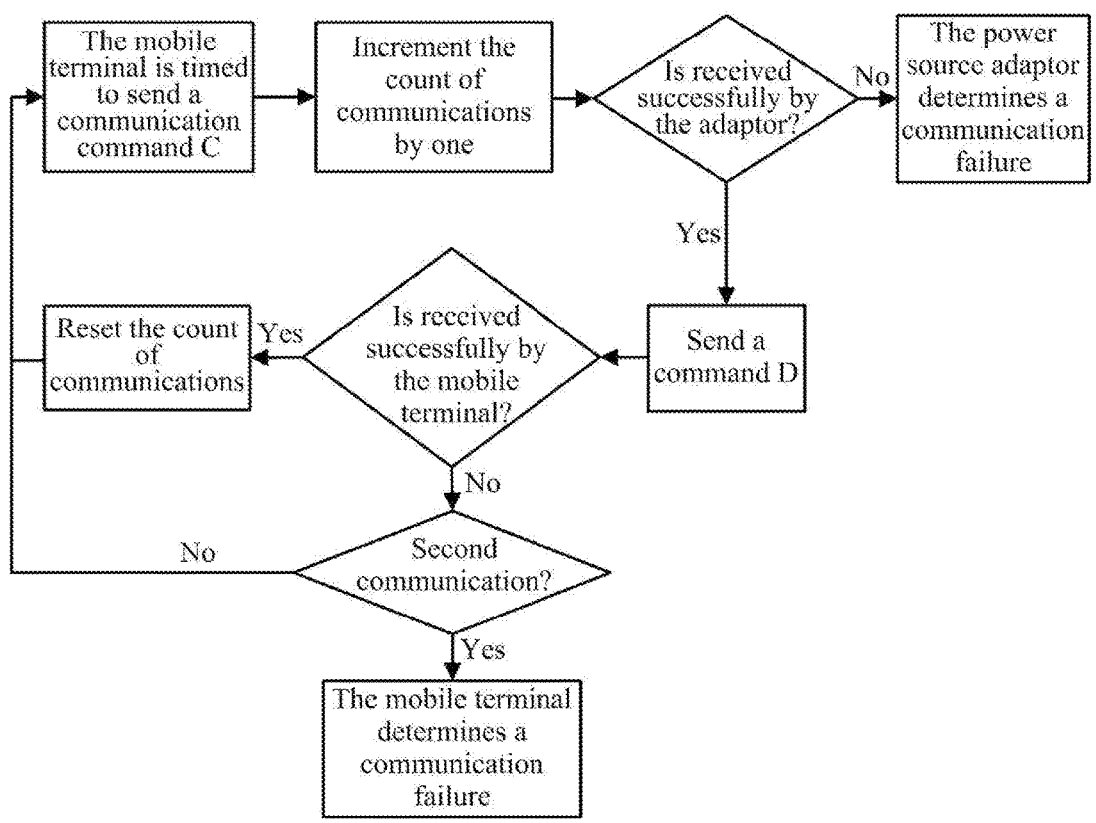
FIG. 4 is a flow chart of an embodiment of a timed detection mechanism of communication between the mobile terminal and the DC-charging power source adaptor illustrated in FIG. 1.

As illustrated in FIG. 2, the rapid charging method generally involves the following operations:

S201. The mobile terminal detects whether a DC-charging power source adaptor is inserted into the USB interface Ji thereof, and performs subsequent operations upon detecting a DC-charging power source adaptor being inserted.

In this embodiment, the DC-charging power source adaptor can be configured to output by default the same constant charging voltage as the charging voltage output by the host and the normal power source adaptor, e.g., 5V constant charging voltage, to thereby accommodate an input power source as required for the power source managing chip in the mobile terminal.

Of course the 5V constant charging voltage here only relates to an embodiment, and for some mobile terminal to be charged at constant voltage of another volt value, the DC-charging power source adaptor will be simply configured to output by default the same constant charging voltage as the charging voltage output by the normal power source adaptor when the normal power source adaptor powers the mobile terminal.

S202. The mobile terminal detects voltage of the battery thereof;

In this embodiment, the voltage of the battery refers to core voltage of the battery.

S203. It is determined whether the core voltage of the battery is in a range [S1, S2] delimited by DC-charging thresholds, and if so, then the flow proceeds to the operation S205; otherwise, the flow proceeds to the operation S204.

In this embodiment, the DC-charging thresholds (a lower voltage threshold S1 and a higher voltage threshold S2) can be determined dependent upon the real condition of the battery, and the range delimited by the DC-charging thresholds can be the same as the voltage range of the battery corresponding to the constant-current charging phase in the standard DCP charging mode (i.e., the traditional charging mode in which the battery charged by the normal power source adaptor). For example, the lower voltage threshold S1 and the high voltage threshold S2 of a 4.2V chargeable battery can be set to S1=3.5V and S2=4.1V respectively.

S204. It is determined whether the core voltage of the battery is less than S1, and if so, then the DC-charging switch is controlled to be kept in a default Off state, and also the power source managing chip is started to receive the constant charging voltage input by the DC-charging power source adaptor, e.g., DC 5V charging voltage, to pre-charge the battery at small current, and the flow returns to the operation S202; otherwise, the flow jumps to the operation S209.

S205. The mobile terminal controls the DC-charging switch to be closed to short the power source managing chip so that the power source managing chip stops operating, and transmits the charging voltage output by the DC-charging power source adaptor directly to the battery to DC-charge the battery.

S206. The mobile terminal communicates with the DC-charging power source adaptor, is timed to acquire the core voltage of the battery, and sends the core voltage to the DC-charging power source adaptor.

S207. The DC-charging power source adaptor searches a preset reference table using the received core voltage for a target charging voltage value corresponding to the core voltage, and further adjusts dynamically its output charging voltage.

In this embodiment, the charging voltage can be adjusted dynamically as follows:

The relationship reference table between the core voltage of the battery and the target charging voltage is preset in the DC-charging power source adaptor, and the DC-charging power source adaptor receives the core voltage of the battery detected and transmitted by the mobile terminal, and searches the reference table using the core voltage for the target charging voltage corresponding to the core voltage to adjust its output voltage to the target charging voltage.

The core voltage of the battery can be divided into several intervals according to the range [S1, S2] delimited by the DC-charging thresholds, for example, the core voltage is divided into N intervals at a span of 100 mV, where N=(S2−S1)/100 mV. For each interval, a target charging voltage value Vout, a target charging current value Itarg, and a charging current maximum value Imax corresponding to the core voltage in the interval are predetermined, and the reference table is created and stored in the DC-charging power source adaptor.

Figure 5:
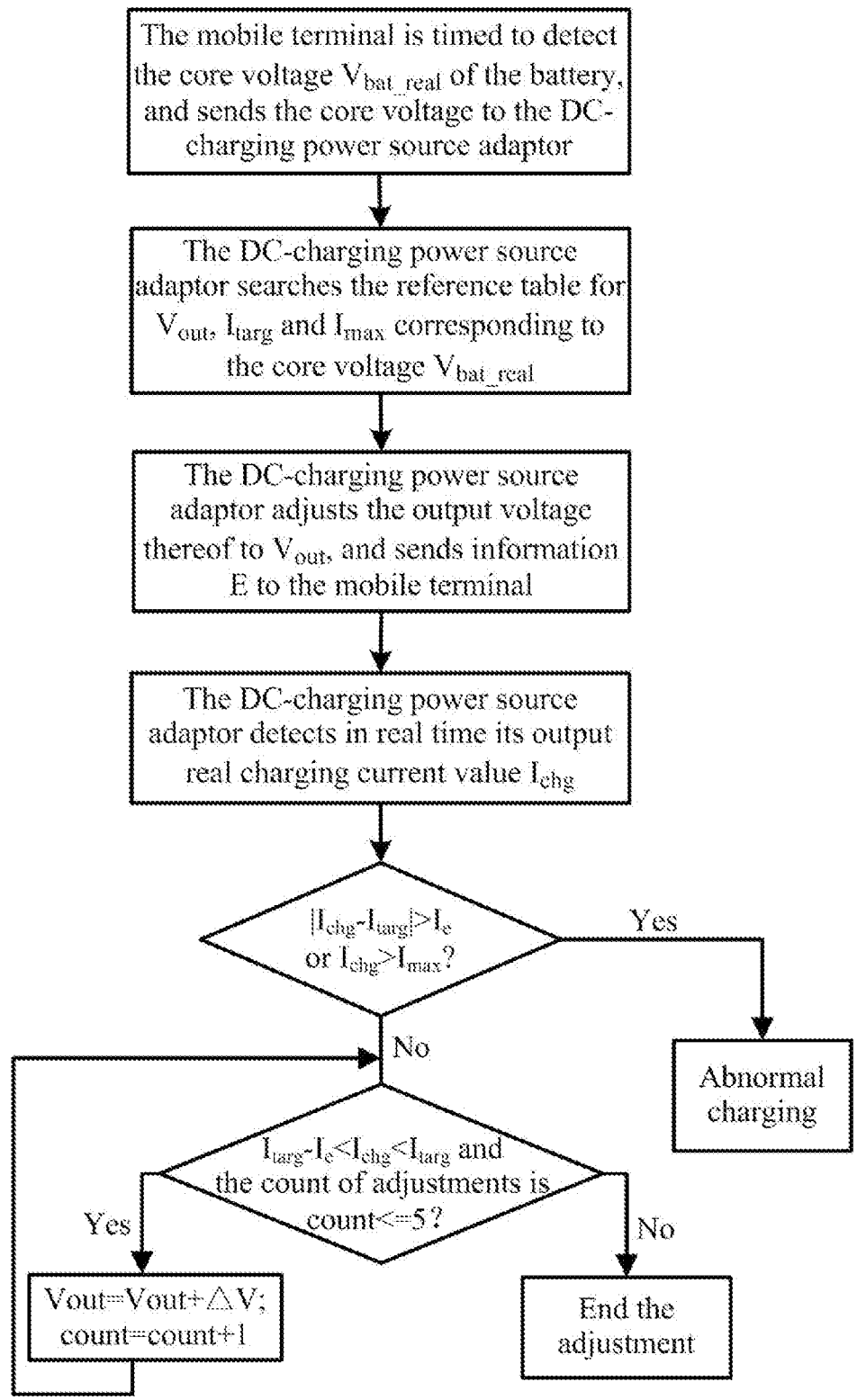
FIG. 5 is a flow chart of control in an embodiment of a DC-charging control strategy using a lookup table.

After entering the DC-charging process, as illustrated in FIG. 5, the microprocessor is timed to detect the core voltage Vbat_real of the battery, and transmits the core voltage to the DC-charging power source adaptor. The DC-charging power source adaptor searches its preset reference table using the detected core voltage Vbat_real, determines the core voltage interval in which the core voltage Vbat_real lies, and then searches using the determined interval for the target charging voltage value Vout, the target charging current value Itarg, and the charging current maximum value Imax corresponding to the interval. Thereafter the DC-charging power source adaptor adjusts the charging voltage output by the AC-DC unit thereof to the target charging voltage value Vout. At the end of the adjusting, the DC-charging power source adaptor sends information E to the mobile terminal, and sends the target charging voltage value Vout, the target charging current value Itarg, and the charging current maximum value Imax to the mobile terminal.

In the DC-charging process, the DC-charging power source adaptor detects in real time the real charging current Ichg output by the AC-DC unit thereof. If |Ichg−Itarg|>Ie or Ichg>Imax, then the DC-charging power source adaptor determines abnormal charging. At this time in order to ensure the safety in charging, the DC-charging power source adaptor can block the charging power source output by the AC-DC unit thereof from charging the mobile terminal. In this embodiment, Ie represents a controllable range of the difference between the real charging current value of the DC-charging power source adaptor and the target charging current value, and in this embodiment, Ie can be set to Ie=500 mA. If |Ichg−Itarg|≤Ie and Ichg≤Imax, then the DC-charging power source adaptor ends this adjusting process, and DC-charges at large current the battery in the mobile terminal using the adjusted charging voltage, where the charging current here can rise beyond 3500 mA, to thereby significantly speed up the charging.

In this embodiment, the charging current maximum value Imax can be determined from the maximum terminal voltage supported by the battery, and inner resistance of the battery; the target charging current value Itarg can be determined from the charging current maximum value Imax; and the target charging voltage value Vout can be determined from the target charging current value Itarg as well as a resistance value on the charging line, a resistance value on a circuit board of the terminal, and the inner resistance of the battery.

In an implementation, the reference table can be created as follows:

A number i of intervals, denoted as xi1~xi2, are set for the core voltage in the range of [S1, S2];

For each of the intervals $[x_{i1}, x_{i2}]$, a target charging voltage value $V_{out}$, a target charging current value $I_{targ}$, and a charging current maximum value $I_{max}$ corresponding to the interval are calculated respectively in the equations of:

$$V_{out} = V_{bat\_real} + I_{targ} * (R_{line} + R_{board} + R_{bat}) \tag{1}$$

$$I_{targ} = I_{max} - \Delta I \tag{2}$$

$$I_{max} = \min((V_{bat\_max} - V_{bat\_real})/R_{bat}, I_{allow}) \tag{3}$$

Where $R_{line}$ represents a resistance value on the charging line; $R_{board}$ represents a resistance value on a circuit board of the mobile terminal; $R_{bat}$ represents an inner resistance value of the battery, which can be experimentally measured;

$V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which lies in the range of [150 mA, 250 mA]; and The reference table is created according to the parameters Vbat_real, Vout, Itarg and Imax.

In this embodiment, in order not to measure $R_{line}$ and $R_{board}$, the sum of the resistance value $R_{line}$ on the charging line, and the resistance value $R_{board}$ on the circuit board of the mobile terminal can be calculated in the equation of:

$$R_{line}+R_{board}=(V_{out}-V_{bat})/I_{chg} \quad (4)$$

Where $V_{bat}$ represents the terminal voltage of the battery. That is, the terminal voltages $V_{bat}$ of the battery, and the charging currents $I_{chg}$, for different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In an implementation of this embodiment, the target charging voltage value Vout and the charging current maximum value Imax corresponding to each interval [xi1, xi2] are calculated as follows: a lower bound value xi1 of the core voltage in the interval is used as Vbat_real and substituted into Equation (1) to calculate the target charging voltage value Vout corresponding to the interval; a higher bound value xi2 of the core voltage in the interval is used as Vbat_real and substituted into Equation (3) to calculate the charging current maximum value Imax corresponding to the interval; and further the target charging current value Itarg is derived from calculated Imax in Equation (2), and the reference table is created.

By way of an example, still taking the 4.2V chargeable battery as an example, for the system powered by the battery, from the perspective of the safety of providing voltage to the device, the terminal voltage Vbat of the battery shall not be more than a fixed value Vbat_max, where the fixed value Vbat_max is dependent upon the platform and less than the specified safe value Vbat_safe of the terminal voltage of the battery. If the safe value Vbat_safe of the terminal voltage of the battery is Vbat_safe=4500 mV, then Vbat_max=4470 mV can be taken, so the terminal voltage Vbat of the battery is Vbat=Vbat_real+Ichg*Rbat≤4470.

From the perspective of the safety of the battery, if the maximum safe charging current value is taken as $I_{allow}$=4000 mA, then the charging current maximum value $I_{max}$ is calculated as follows in Equation (3):

$$I_{max}=\min((4470-V_{bat\_real})/R_{bat}, 4000) \quad (5)$$

If the inner resistance $R_{bat}$ of the battery is $R_{bat}$=100 mΩ, the other impedance is $R_{line}+R_{board}$=100 mΩ, and the range delimited by the DC-charging thresholds of the battery is [3500 mV, 4100 mV] at a span of 100 mV, then the range [3500 mV, 4100 mV] delimited by the DC-charging thresholds is divided into 6 intervals; a higher bound value of the core voltage in each interval is substituted into Equation (5) to calculate the charging current maximum value $I_{max}$; the target charging current value $I_{targ}$ is derived from calculated $I_{max}$ in Equation (2), and $\Delta I$=200 mA is taken in this embodiment; and a lower bound value of the core voltage in each interval is substituted into Equation (1) to calculate the target charging voltage value $V_{out}$ from calculated $I_{targ}$, so the desirable reference table is created as follows:

| $V_{bat\_real}$ (mV) | $V_{out}$ (mV) | $I_{targ}$ (mA) | $I_{max}$ (mA) |
|---|---|---|---|
| 3500-3600 | 4260 | 3800 | 4000 |
| ... | ... | ... | ... |
| 4000-4100 | 4700 | 3500 | 3700 |

The reference table reflects to some extent the correspondence relationship between the core voltage of the battery, and the charging current and the charging voltage output by the adaptor, but there may be a minor error relative to the real correspondence relationship, so the battery can be experimentally charged to record the charging voltage varying with the varying charging current, and to adjust the values of the parameters in the reference table, for example, the values of the respective parameters in the reference table are adjusted to their ideal values by averaging them.

The target charging voltage obtained by looking up from the table is a theoretical value, however in reality, the inner resistance of the battery, and the impedance on the line may vary with temperature, aging, and other factors, so the real charging current value $I_{chg}$ output by the DC-charging power source adaptor deviates to some extent from the target charging current value $I_{targ}$, thus resulting in some influence upon the charging speed. In order to boost the charging current as much as possible in an allowable range to further speed up charging, in this embodiment, a charging current self-adjusting algorithm is introduced at the DC-charging power source adaptor end, as illustrated in FIG. 5, that is, after the DC-charging power source adaptor adjusts the output voltage to $V_{out}$, if $I_{targ}-I_e \le I_{chg} < I_{targ}$, then the target charging voltage value $V_{out}$ is adjusted up by a preset value $\Delta V$ to boost the charging voltage output by the DC-charging power source adaptor. $V_{out}=V_{out}+\Delta V$ can be adjusted progressively so that the real charging current value $I_{chg}$ output by the DC-charging power source adaptor approaches progressively the target charging current value $I_{targ}$.

In this embodiment, Vout can be adjusted for five times by an amount which can be estimated in Equation (1), and if Vbat_real and R (including the inner resistance of the battery, the line resistance, and all the other impedances) are invariable, then $\Delta V = \Delta I * R$. In this embodiment, $\Delta V$ can be set to $\Delta V$=10 mV.

S208. The mobile terminal detects whether the core voltage of the battery goes beyond the range delimited by the DC-charging thresholds, and if not, then the flow returns to the operation S206; otherwise, the flow proceeds to a subsequent operation.

S209. The microprocessor controls the DC-charging switch to be opened to disconnect the DC-charging pathway, instructs the DC-charging power source adaptor to adjust the output voltage thereof to the default constant charging voltage, e.g., 5V DC-charging voltage, and starts the power source managing chip to receive the constant charging voltage to charge the battery at the constant voltage until the battery is fully charged.

In order to ensure the safety of the mobile terminal being charged, the following charging abnormality handling mechanism is proposed in this embodiment:

1. At the mobile terminal side (1) The mobile terminal detecting that it is being powered by the DC-charging power source adaptor is timed to send a handshake instruction to the DC-charging power source adaptor, and waits for a preset period of time until the DC-charging power source adaptor feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the DC-charging process, if the mobile terminal detects that the DC-charging power source adaptor is pulled out suddenly, then it disconnects the DC-charging pathway between the charging interface of the mobile terminal and the battery, and has the charging interface connected with the power source managing chip;

(3) After entering the DC-charging process, if the mobile terminal detects that the terminal voltage of the battery exceeds the preset threshold (the threshold of the terminal voltage of the 4.2V chargeable battery can be preset to 4.6V), then it disconnects the DC-charging pathway between the charging interface of the mobile terminal and the battery, and instructs the DC-charging power source adaptor to switch to the default constant charging voltage for output, e.g., 5V DC voltage;

(4) After entering the DC-charging process, the mobile terminal detects in real time the received real charging current value Ichg, and if the absolute value of the difference between Ichg and Itarg goes beyond the preset controllable range of the difference, then it disconnects the DC-charging pathway between the charging interface of the mobile terminal and the battery, and switches to the power source managing chip to charge the battery; and (5) After entering the DC-charging process, the mobile terminal detects in real time the received real charging current value Ichg, and if Ichg is more than Imax, then it disconnects the DC-charging pathway between the charging interface of the mobile terminal and the battery, and notifies the user of the power source adaptor being abnormal 2. At the DC-charging power source adaptor side (1) The DC-charging power source adaptor obtaining the target charging voltage value Vout, the target charging current value Itarg, and the charging current maximum value Imax detects in real time its output real charging current value Ichg, and if the absolute value of the difference between Ichg and Itarg goes beyond the preset controllable range of the difference, then the DC-charging power source adaptor stops outputting the charging power source, and flicks a lamp to alert the user;

(2) After entering the DC-charging process, the DC-charging power source adaptor detects in real time its output real charging current value Ichg, and if Ichg is more than Imax, then it determines abnormal charging, and stops the charging power source from being output to avoid the mobile terminal from being damaged due to being further powered.

The charging method according to this disclosure can be widely applied to a handset, a tablet computer, a notebook computer, a mobile power source, and other mobile terminals so as to satisfy different charging demands of the user.

Advantages and beneficial effects of this disclosure lie in that in this disclosure, the rapid charging method is designed for the power source adaptor outputting dynamically adjustable voltage, where in the segmented constant-current-like charging mode, the volt value of the charging voltage output by the power source adaptor is adjusted dynamically according to the interval in which the core voltage of the battery in the mobile terminal lies, and the battery is DC-charged directly using the charging voltage output by the power source adaptor, so that the battery in the mobile terminal can be charged at higher voltage to thereby significantly improve the charging current so as to speed up charging of the battery, to shorten the period of time required for charging the mobile terminal, to alleviate such an influence upon the user in a daily access to the mobile terminal that arises from the mobile terminal being frequently charged for a long period of time, and to greatly improve the satisfactory of the user with the mobile terminal.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal comprising:
a battery configured to store electric energy;
a USB interface configured to connect with a DC-charging power source adaptor;
a DC-charging switch connected between the USB interface and the battery;
a power managing chip connected between the USB interface and the battery; and
a microprocessor configured to detect a voltage of the battery upon detecting the USB interface is connected with the DC-charging power source adaptor; and if the voltage of the battery is in a range S1 to S2 delimited by preset DC-charging thresholds, send the voltage of the battery to the DC-charging power source adaptor so that the DC-charging power source adaptor outputs a target charging voltage corresponding to the current voltage of the battery, and control the DC-charging switch to close upon detecting the voltage of the battery is in the range S1 to S2 to transmit the target charging voltage output by the DC-charging power source adaptor directly to the battery to charge the battery; and
a power managing chip connected between the USB interface and the battery, the power managing chip configured to be controlled by the microprocessor to receive the target charging voltage output by the DC-charging power source adaptor and charge the battery when the microprocessor detects that the voltage of the battery is out of the range S1 to S2 delimited by the preset DC-charging thresholds.

2. The mobile terminal according to claim 1, wherein the microprocessor is configured to, upon detecting the voltage of the battery is less than S1, communicate with the DC-charging power source adaptor to instruct the DC-charging power source adaptor to output a constant charging voltage, and start the power source managing chip to pre-charge the battery at a small current; and to, upon detecting the voltage of the battery is more than S2, instruct the DC-charging power source adaptor to output the constant charging voltage, and start the power source managing chip to charge the battery at the constant voltage.

3. A DC-charging power source adaptor comprising:
a charging interface configured to externally connect with a mobile terminal;

an AC to DC converting unit configured to convert an AC input power source into a charging voltage required by the mobile terminal, and output the charging voltage via the charging interface;

a switch circuit connected between the AC to DC converting unit and the charging interface;

a controlling unit connected with the charging interface; and a current detecting unit configured to detect in real time a charging current $I_{chg}$ output via the charging interface, and feedback the charging current $I_{chg}$ to the controlling unit, wherein the controlling unit is configured to communicate with the mobile terminal after the charging interface is connected with the mobile terminal, receive a voltage of a battery in the mobile terminal in a range delimited by DC-charging thresholds sent by the mobile terminal, search a preset reference table using the voltage of the battery for a target charging voltage value $V_{out}$ corresponding to an interval in which the voltage of the battery lies, adjust the charging voltage output by the AC to DC converting unit to the target charging voltage value $V_{out}$, search the preset reference table using the voltage of the battery for a target charging current value $I_{targ}$ and a charging current maximum value $I_{max}$ corresponding to the interval in which the voltage of the battery lies, upon detecting that $I_{trag}-I_e \leq I_{chg} < I_{trag}$, control the DC-charging power source adaptor to increase its charging voltage by a preset value $\Delta V$, and upon detecting the absolute value of the difference between the charging current $I_{chg}$ and the target charging current value $I_{targ}$ is more than $I_e$ or the charging current $I_{chg}$ is more than a charging current maximum value $I_{max}$ control the switch circuit to disconnect a charging voltage transmission line between the DC-charging power source adaptor and the charging interface, and wherein $I_e$ represents a controllable range of the difference between the real charging current value of the DC-charging power source adaptor and the target charging current value $I_{targ}$.

4. The DC-charging power source adaptor according to claim 3, wherein the controlling unit is configured to adjust the DC-charging power source adaptor to output a constant charging voltage when the voltage of the battery in the mobile terminal is out of the range delimited by the DC-charging thresholds.

5. A rapid charging method comprising:

detecting, by a mobile terminal, voltage of a battery thereof;

if the voltage of the battery is in a range S1 to S2 delimited by preset DC-charging thresholds, then sending the voltage of the battery to a DC-charging power source adaptor;

searching, by the DC-charging power source adaptor, a preset reference table using the voltage of the battery for a target charging voltage value $V_{out}$ corresponding to an interval in which the voltage of the battery lies and for a target charging current value $I_{targ}$ corresponding to the interval in which the voltage of the battery lies;

adjusting, by the DC-charging power source adaptor, its output charging voltage to the target charging voltage value $V_{out}$;

receiving, by the mobile terminal, the charging voltage output by the DC-charging power source adaptor, and transmitting the charging voltage to the battery to DC-charge the battery;

detecting, by the DC-charging power source adaptor, its real charging current $I_{chg}$ output to the mobile terminal; and if the real charging current $I_{chg}$ is less than the target charging current value $I_{targ}$, then increasing the target charging voltage value $V_{out}$ by a preset value $\Delta V$.

6. The rapid charging method according to claim 5, further comprising if the absolute value of the difference between the real charging current $I_{chg}$ and the target charging current value $I_{targ}$ is more than a preset value, then stopping the charging voltage from being output, wherein the preset value represents a controllable range of the difference between the real charging current value and the target charging current value.

7. The rapid charging method according to claim 5, wherein searching the preset reference table includes searching the preset reference table for a charging current maximum value $I_{max}$ corresponding to the interval in which the voltage of the battery lies.

8. The rapid charging method according to claim 7, further comprising if the real charging current $I_{chg}$ is more than the charging current maximum value $I_{max}$, then stopping the charging voltage from being output.

9. The rapid charging method according to claim 7, wherein:

the charging current maximum value $I_{max}$ is determined from a maximum terminal voltage supported by the battery and an inner resistance of the battery;

the target charging current value $I_{targ}$ is determined from the charging current maximum value $I_{max}$; and the target charging voltage value $V_{out}$ is determined from the target charging current value $I_{targ}$, a resistance value on a charging line, a resistance value on a circuit board of the mobile terminal, and the inner resistance of the battery.

10. The rapid charging method according to claim 9, wherein the target charging voltage value $V_{out}$, the target charging current value $I_{targ}$ and the charging current maximum value $I_{max}$ corresponding to each interval are calculated in the equations of:

$$I_{max} = \min((V_{bat\_max} - V_{bat\_real})/R_{bat}, I_{allow}),$$

$$I_{targ} = I_{max} - \Delta I,$$

$$V_{out} = V_{bat\_real} + I_{targ} * (R_{line} + R_{board} + R_{bat}), \text{and}$$

wherein $R_{line}$ represents the resistance value on the charging line; $R_{board}$ represents the resistance value on the circuit board of the mobile terminal; $R_{bat}$ represents the inner resistance value of the battery; $V_{bat\_max}$ represents the maximum terminal voltage value supported by the battery; $I_{allow}$ represents the maximum safe charging current value selected while ensuring the safety of the battery being charged; and $\Delta I$ represents a preset difference in current.

11. The rapid charging method according to claim 10, wherein the DC-charging power source adaptor takes a lower bound value of the core voltage in said each interval as $V_{bat\_real}$, and calculates the target charging voltage value $V_{out}$ corresponding to the interval in which the voltage of the battery lies; and the DC-charging power source adaptor takes a higher bound value of the core voltage in said each interval as $V_{bat\_real}$, and calculates the charging current maximum value $I_{max}$ corresponding to the interval in which the voltage of the battery lies.

12. The rapid charging method according to claim 5, further comprising:
- instructing, by the mobile terminal, the DC-charging power source adaptor to output a constant charging voltage by default and transmit the constant charging voltage to a power source managing chip in the mobile terminal to start the power source managing chip to pre-charge the battery at a small current if the voltage of the battery is less than S1; and
- instructing, by the mobile terminal, the DC-charging power source adaptor to output the constant charging voltage by default and transmit the constant charging voltage to the power source managing chip in the mobile terminal to start the power source managing chip to charge the battery at the constant voltage if the voltage of the battery is more than S2.

13. The rapid charging method according to claim 11, further comprising:
- instructing, by the mobile terminal, the DC-charging power source adaptor to output a constant charging voltage by default and transmit the constant charging voltage to a power source managing chip in the mobile terminal to start the power source managing chip to pre-charge the battery at a small current if the voltage of the battery is less than S1; and
- instructing, by the mobile terminal, the DC-charging power source adaptor to output the constant charging voltage by default and transmit the constant charging voltage to the power source managing chip in the mobile terminal to start the power source managing chip to charge the battery at the constant voltage if the voltage of the battery is more than S2.

14. The rapid charging method according to claim 7, wherein:
- instructing, by the mobile terminal, the DC-charging power source adaptor to output a constant charging voltage by default and transmit the constant charging voltage to a power source managing chip in the mobile terminal to start the power source managing chip to pre-charge the battery at a small current if the voltage of the battery is less than S1; and
- instructing, by the mobile terminal, the DC-charging power source adaptor to output the constant charging voltage by default and transmit the constant charging voltage to the power source managing chip in the mobile terminal to start the power source managing chip to charge the battery at the constant voltage if the voltage of the battery is more than S2.

15. The rapid charging method according to claim 6, further comprising:
- instructing, by the mobile terminal, the DC-charging power source adaptor to output a constant charging voltage by default and transmit the constant charging voltage to a power source managing chip in the mobile terminal to start the power source managing chip to pre-charge the battery at a small current if the voltage of the battery is less than S1; and
- instructing, by the mobile terminal, the DC-charging power source adaptor to output the constant charging voltage by default and transmit the constant charging voltage to the power source managing chip in the mobile terminal to start the power source managing chip to charge the battery at the constant voltage if the voltage of the battery is more than S2.

* * * * *